No. 886,420. PATENTED MAY 5, 1908.
C. SELLENSCHEIDT.
LINING FOR FILTER ELEMENTS.
APPLICATION FILED OCT. 8, 1907.
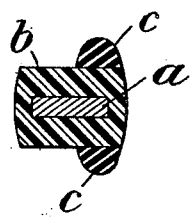
Attest:
Inventor:
Carl Sellenscheidt
by
Attys.

UNITED STATES PATENT OFFICE.

CARL SELLENSCHEIDT, OF BERLIN, GERMANY.

LINING FOR FILTER ELEMENTS.

No. 886,420.  Specification of Letters Patent.  Patented May 5, 1908.

Application filed October 8, 1907. Serial No. 396,360.

*To all whom it may concern:*

Be it known that I, CARL SELLENSCHEIDT, a citizen of Germany, residing at Berlin, Germany, have invented new and useful Improvements in Linings for Filter Elements, of which the following is a specification.

This invention relates to improvements in filter elements, and consists in a covering or lining of a hard rubber, vulcanite or similar covering or lining for the metal frame thereof, combined with soft rubber applied to said lining at the margin or where a tight joint is required.

The drawing forming a part hereof illustrates a section through one of the side members of a filter element constructed in accordance with my invention.

Referring to the drawing, $a$ represents one of the frame members of a filter element of any desired or usual form or kind, the same being shown in section; $b$ is a covering or lining completely surrounding the frame member and protecting the liquid from contact with the metal. This covering can be formed of a comparatively cheap grade of rubber, more or less hard, or regular hard rubber or vulcanite, and serves the advantage not only of protecting the frame from contact with the liquid but materially reinforces and strengthens the frame.

$c$ represents portions of soft rubber secured by vulcanization or other means to those parts of the lining which are intended to form the joint with other elements and constitute packings for the filter element which insure a perfectly tight joint. The covering may be used either for simple frames with or without grids or network or for stiffening tissue frames or for the supporting parts of grille frames.

I am aware that use has heretofore been made in metal filter frames of a strip of hard rubber as the intermediate connecting piece between the metal and a permanent soft rubber packing, and I do not claim such arrangement herein.

What I claim and wish to secure is

A filter element comprising a metallic frame member, a stiffening lining inclosing the same, formed of more or less hard rubber or vulcanite, combined with portions of soft rubber at the parts intended for forming joints with other elements.

In testimony whereof I have signed my name to this specification in the presence of two subscribing witnesses.

CARL SELLENSCHEIDT.

Witnesses:
HENRY HASPER,
HANS HEINMAN.